July 30, 1957   F. H. GATHERCOAL   2,800,865
METHOD OF SUBSOIL IRRIGATION AND FERTILIZATION
Original Filed April 19, 1951
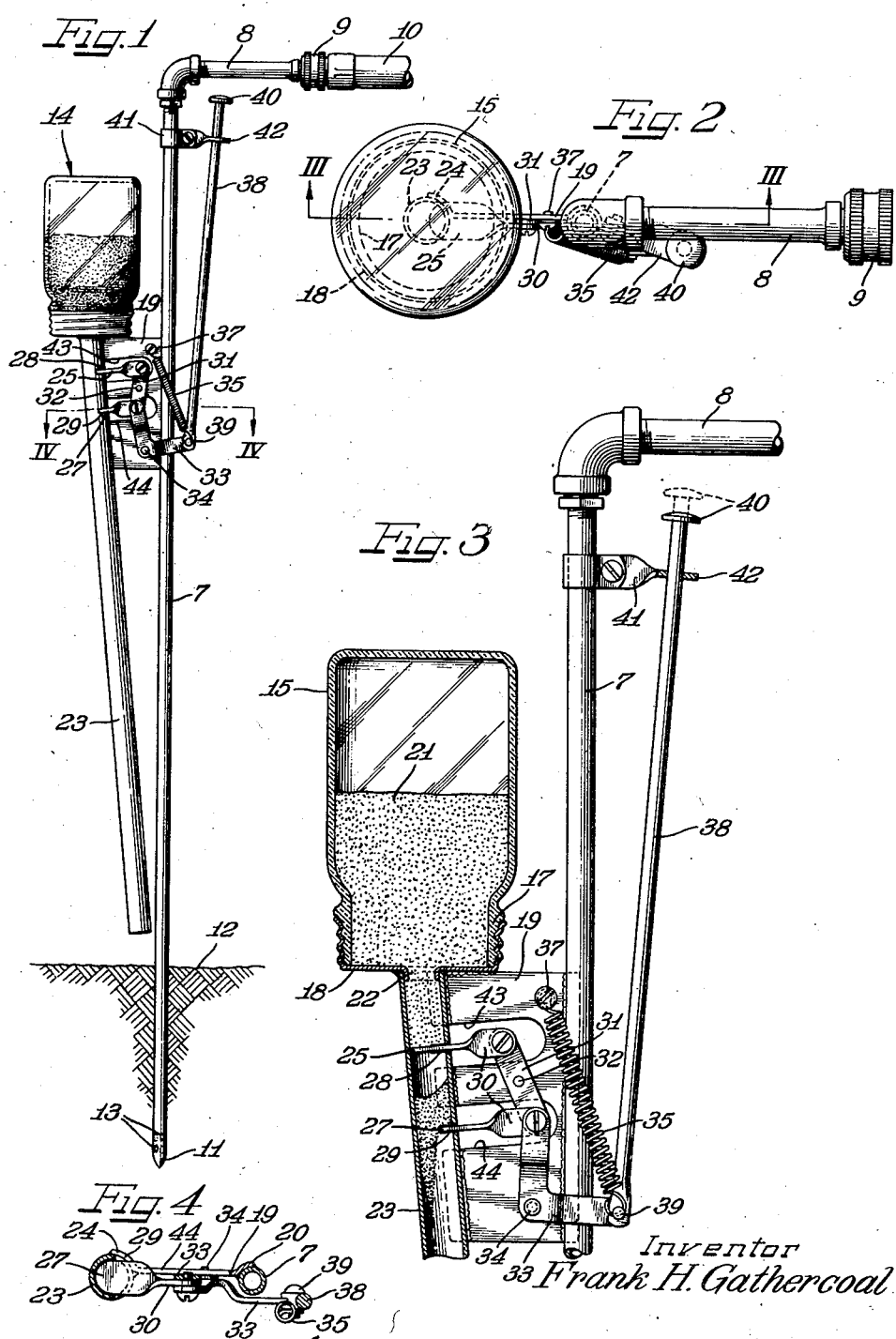

United States Patent Office 2,800,865
Patented July 30, 1957

2,800,865

METHOD OF SUBSOIL IRRIGATION AND FERTILIZATION

Frank H. Gathercoal, Corvallis, Oreg., assignor to Joseph D. Gathercoal, Wilmette, Ill.

Original application April 19, 1951, Serial No. 221,778, now Patent No. 2,718,856, dated September 27, 1955. Divided and this application May 6, 1954, Serial No. 430,218

4 Claims. (Cl. 111—7.1)

This is a divisional application of the application of Frank H. Gathercoal, Serial No. 221,778 filed April 19, 1951, now Patent No. 2,718,856 issued September 27, 1955, entitled "Material Dispenser."

The present invention relates to improvements in the conditioning and treatment of soil about or adjacent to growing plants.

In the application of fertilizer or root-treatment insecticides it is not only necessary that the applied material be properly placed but also that there be adequate moisture in the soil for either dissolving or diluting the material or providing a proper environment for soil organism action on the material and in any event to cause the material to be distributed throughout a substantial subsoil area.

Heretofore it has been proposed to introduce fertilizer, for example, directly into a subsoil spot in a water dispersion. This is not satisfactory in many instances and in some cases may be even dangerous because undesirable or unnecessary concentration of the applied material may be effected in such spot, tender plant feeder roots may be chemically injured, the material may be applied below a substantial depth of soil that should also be treated, and residues of the applied material will be beyond a depth at which normal rainfall or surface watering will have any appreciable further conditioning effect on the material during a growing season.

An important object of the present invention is to provide an improved method of treating the soil about or adjacent to growing plants.

Another object of the invention is to provide an improved method of subsoil irrigation and surface application of free-flowing soil or plant conditioning material.

A further object of the invention is to provide a soil area to a substantial depth with immediate and continuing effects of treating material.

Other objects, features and advantages of the present invention will be readily apparent from the following detailed description of a preferred embodiment thereof taken in conjunction with the accompanying drawings, in which:

Figure 1 is a side elevational view of a combination subsoil irrigation and material applying appliance embodying the features of the present invention;

Figure 2 is an enlarged top plan view of the appliance of Fig. 1;

Figure 3 is a fragmentary vertical sectional detail view, with parts in elevation, taken substantially on the line III—III of Fig. 2 and showing the material-controlling valve structure as it appears when a charge of the material is being deposited; and Figure 4 is a transverse sectional detail view taken substantially on the line IV—IV of Fig. 1.

I have found my method of soil and plant treatment to be productive of exceptionally good results. According to my method, the soil immediately at the root system or near a plant to receive treatment is subsoil irrigated to a desired depth and water is introduced at the chosen depth for a time interval sufficient to saturate the immediate soil area to a sufficient extent to cause water to back up onto the surface above the point at which the water is introduced into the soil. This assures a substantial distribution of the water laterally as well as downwardly and to the surface. Onto the surface of the thoroughly wet soil area is then applied a charge of a free-flowing treatment material such as fertilizer or insecticide, or a combination of fertilizer and insecticide. As the water soaks down from the surface it carries with it at least some of the surface-deposited material. Capillary action in the soil causes a continuing action of the moisture on the material and further dissemination of the material in solution and in fine particle form from the surface deposit into the soil. Surface deposited water such as rain will further act upon the surface deposited material to distribute the same in the soil, as time goes on. In a period of drought further subsurface irrigation with surface involvement will have the same effect. It will thus be apparent that my method is a close artificial approximation to the natural soil processes in impregnating the soil with nutrients or insecticides, and over an extended period of effectiveness following application of the material to the soil. Furthermore, normal action of the weather elements and topsoil organisms will break down and eventually reduce to soluble form the coarser and originally undissolved or insoluble particles that may be applied to the surface of the soil.

An appliance suitable for carrying out the described method is shown in Fig. 1. It comprises an elongated pipe body member 7 which for purpose of light weight and efficiency is preferably of as small a diameter as practicable for the use to which the appliance is to be put. The length of the body pipe 7 is preferably such that it can be used by an adult of average height conveniently and without stooping and without unusual manual or muscular effort. At its upper end the pipe body 7 has an angularly disposed pipe handle portion 8 carrying a terminal swivel connector 9 by which a water hose 10 is detachably connectable to the appliance. At its lower end the pipe body 7 has a pointed earth penetrating tip 11 which serves also as a lower end closure for the pipe bore.

Subsoil irrigation is effected by manipulating the pipe body 7, as by means of the tubular water conducting handle 8 to force the lower pointed end portion 11 of the irrigator into a body of soil 12 to a predetermined depth. Water from a suitable source conducted to the device through the flexible hose 10 issues from a plurality of small discharge ports 13 located immediately above the pointed tip 11 and directed in uniformly spaced and distributed radial directions from the pipe body 7 so that the water is forced substantially uniformly into the surrounding soil.

After the soil into which the pipe member 7 has been driven has become saturated to the extent that water backs up onto the surface of the soil 12 about the area surrounding the pipe 7, a charge of free-flowing material is applied to the wet surface of the soil from an applicator 14 carried by the pipe body 7. In the present instance the applicator 14 is shown as adapted for supporting a supply of finely divided material such as fertilizer, insecticide, or fungicide, or a combination thereof for application by predetermined quantities or charges, but it will be readily apparent that if desired the applicator 14 can be equipped to apply material in solution or liquid form.

In the construction shown, the material applicator 14 comprises a material container 15 which is preferably in the form of a transparent jar made from plastic or glass and provided with a neck 17 for detachable engagement with a supporting head member 18 which may be in the form of an inverted screw cap into which the neck 17 of the jar is adapted to be threadedly engaged.

The head member 18 is fixedly supported upon the pipe body 7 through the medium of a bracket member 19 in the form of a vertical plate having a longitudinal edge flange formation 20 shaped complementary to the external surface of the pipe 7 and secured thereto as by soldering, brazing, or welding. The bracket plate 19 projects laterally from the body pipe 7 and has the head member 18 secured to the upper edge thereof in spaced relation to the body pipe 7 to facilitate attachment or removal of the material containing jar 15 (Figs. 1, 3 and 4).

Finely divided, dry free-flowing material 21 supported within the jar 15 and on the head 18 is adapted to flow downwardly through an opening 22, preferably located centrally in the head 18. From the delivery port or opening 22, the material flows down into a delivery tube 23 which is secured to the underside of the head member 18 and to the outer margin of the bracket plate member 19 which for this purpose may be provided with a complementary outer marginal flange formation 24 soldered, welded or brazed to the delivery pipe 23. By preference the supporting bracket 19 is located on the upper portion of the body pipe member 7 and the delivery pipe or tube 23 is directed in inclined relation toward the lower end portion of the body pipe 7 with the lower discharge end of the delivery tube located close to the body pipe member but spaced a substantial distance above the tip 11 of the body pipe member so that when the body pipe member is in subsoil irrigating position the discharge tip of the delivery tube will be at least moderately spaced above the surface of the soil, substantially as shown in Fig. 1.

For controlling discharge of the material 21, valve mechanism is provided which is preferably of such form as to control the discharge of the material by predetermined or measured charges. To this end the valve means comprises a pair of plunger blade valve members 25 and 27 operatively disposed in vertically spaced relation in material flow controlling relation to the upper portion of the delivery tube 23. The valve member 25 extends operatively into the tube 23 through a slot 28 while the valve member 27 extends operatively into the tube member through a similar slot 29 spaced a predetermined distance below the slot 28. While the operative valve portions of the members 25 and 27 are disposed in planes normal to the axis of the tube 23, the outer portions of the valve members have preferably vertically coplanar respective attachment or pivot ear portions 30 which are pivotally connected to the respective opposite end portions of a coordinating lever 31. A pivot pin 32 intermediately pivotally secures the coordinating lever 31 to the bracket plate 19. Through this arrangement it will be apparent that pivoting of the lever 31 causes the valve members 25 and 27 to be moved alternately into and out of material flow blocking relation to the passage in the delivery tube 23. As shown in Figs. 1, 2 and 4 the upper valve member 25 is retracted from flow blocking relation and the lower valve member 27 is protracted into flow blocking relation to the delivery tube passage so that the material 21 can flow down into the longitudinal area or space between the valve members in the delivery tube. By reversing the position of the valve members as shown in Fig. 3, the upper valve member 25 enters into blocking relation and the lower valve member 27 is withdrawn from blocking relation so that the flow of material from the container 15 is blocked but the material in the space between the two valve members can escape and flow down the delivery tube 23 for discharge onto the surface of the irrigated soil. It will be observed from Figs. 2 and 4 that the tips of the valve members 25 and 27 are formed arcuately complementary to the inner wall of the tube member 23 so as to effect a substantial sealing engagement therewith.

Means are provided for normally maintaining the valve members 25 and 27 in the position wherein the lower valve member 27 blocks flow of material from the tube 23. To this end, a bell crank lever 33 is intermediately pivotally connected as by means of a pivot pin 34 to the lower portion of the bracket plate 19 with one arm extending upwardly and connected pivotally to the lower end portion of the coordinating lever 31 while the other arm of the bell crank lever projects past the body pipe 7. To the distal end portion of the laterally extending arm of the bell crank 33 is connected a tension spring 35, the other end of which is anchored as indicated at 37 to the upper portion of the bracket member 19. The spring 35 normally draws the lateral arm of the bell crank 33 upwardly and thus normally maintains the coordinating lever 31 rocked to the position shown in Fig. 1 wherein the lower valve member 27 is in flow blocking relation in the delivery tube 23 and the upper valve member 25 is withdrawn from the flow blocking relation so that a charge of material is supported in the space between the two valve members.

When a charge of material is to be delivered down the tube 23, manual means in the form of an upwardly extending operating rod 38 are actuated to rock the bell crank lever 33 and correspondingly rock the coordinating lever 31 into the relationship shown in Fig. 3. For this purpose the operating rod 38 is pivotally connected at its lower end as by means of a pin 39 to the distal end portion of the lateral arm of the bell crank 33, and the upper end portion of the operating rod 38 carries a button or knob 40 located conveniently under the handle portion 8 so that finger or thumb pressure applied to the knob 40 to push the operating rod from the dash outline position shown in Fig. 3 into the full line position will effect rocking of the levers to operate the valve members.

For retaining the upper portion of the operating rod 38 in operative position a bracket member 41 is attached to the upper portion of the body pipe 7 and has a guide eye 42 through which the rod 38 extends slidably.

To provide operative clearance for the valve members 25 and 27, the bracket plate 19 is preferably formed with clearance slots or apertures 43 and 44, respectively.

It will thus be apparent that in the operation of the appliance, after the soil area into which the pipe body 7 has been driven is sufficiently irrigated to show water on the surface of the soil, downward movement of the operating rod 38 causes coordinated movement of the control valves 25 and 27, through rocking of the connected bell crank 33 and the coordinating lever 31 to release a predetermined charge of the material 21 down the delivery tube 23. The material drops from the elevated lower end of the delivery tube 23 onto the surface of the ground adjacent to and about the pipe body 7. The amount of material 21 to be deposited in any one location is thus easily controlled.

When the pipe body 7 is withdrawn from the irrigated and treated place in the soil, a water filled hole will be left more or less where the pipe had penetrated the ground. Some of the material deposited on the ground may be drawn down this hole as the water recedes, and in any event aeration of the soil is thereby effected. In most instances the hole will fill up by collapsing of the wet soil. In any event the material deposited on the saturated soil will, by action of the water showing at the surface and into which the material drops, be carried down into the soil and capillary and weathering action will continue the process of incorporation of the material into the soil over an extended period of time.

It will be understood that modifications and variations may be effected without departing from the scope of the novel concepts of the present invention.

I claim as my invention:

1. A method of treating the soil adjacent to a growing plant with a free-flowing treating material, which comprises subsoil irrigating to a substantial depth until water shows at the surface of the soil, and applying to the surface of the soil whereat the water shows a charge of dry free-flowing soil treating material in finely divided condition to be contacted by the surface water resulting from said subsoil irrigation and carried by said surface water into the soil as the water soaks down from the surface.

2. A method as defined in claim 1 wherein said soil irrigating is effected by a tube inserted into the soil and the tube is withdrawn after the soil treating material has been applied to the water on said surface whereby some of the material will be drawn down the hole left by the withdrawn tube as the water recedes.

3. A method as defined in claim 1 wherein the soil treating material comprises and at least partially soluble fertilizer.

4. A method as defined in claim 1 wherein the soil treating material at least includes an insecticide.

References Cited in the file of this patent

UNITED STATES PATENTS

| | | |
|---|---|---|
| 445,510 | Black | Jan. 27, 1891 |
| 2,020,571 | Pick | Nov. 12, 1935 |
| 2,172,574 | Campbell | Sept. 12, 1939 |
| 2,242,789 | McFee | May 20, 1941 |
| 2,625,529 | Hedrick et al. | Jan. 13, 1953 |

OTHER REFERENCES

The Complete Garden Handbook, by Simon et al., Van Nostrand Company, 1950; page 64.